United States Patent
Riddle et al.

[11] Patent Number: 5,901,994
[45] Date of Patent: May 11, 1999

[54] ANIMAL PICK-UP DEVICE

[76] Inventors: Paul Riddle, Rte. 8 Bx. 447; Valerie T Price, 328 Rawls Dr., both of Leesville, S.C. 29070

[21] Appl. No.: 09/022,919

[22] Filed: Feb. 12, 1998

Related U.S. Application Data

[60] Provisional application No. 60/037,778, Feb. 13, 1997.

[51] Int. Cl.⁶ ........................................................ B25J 1/04
[52] U.S. Cl. .............................................. 294/19.1; 294/24
[58] Field of Search .................................. 294/19.1, 19.3, 294/24, 50.6, 50.8, 50.9, 51, 99.1, 57; 119/801, 806, 807

[56] References Cited

U.S. PATENT DOCUMENTS

| | | |
|---|---|---|
| 721,829 | 3/1903 | Orr . |
| 721,917 | 3/1903 | Priebe . |
| 843,942 | 2/1907 | Hall ........................................ 294/19.1 |
| 933,257 | 9/1909 | Luckhard . |
| 1,036,292 | 8/1912 | McDonald et al. . |
| 1,084,524 | 1/1914 | Andrews . |
| 1,638,184 | 8/1927 | Curtis ...................................... 294/19.1 |
| 1,715,039 | 5/1929 | Locke et al. ............................ 294/99.1 |
| 3,117,555 | 1/1964 | Hayden . |
| 3,125,992 | 3/1964 | King . |
| 3,171,386 | 3/1965 | DeRonde ................................ 294/19.1 |
| 3,785,689 | 1/1974 | Tanksley . |
| 3,885,824 | 5/1975 | Hulst . |
| 3,937,512 | 2/1976 | Baughman . |
| 3,957,299 | 5/1976 | Johnson et al. ........................ 294/50.9 |
| 4,001,903 | 1/1977 | Hay ......................................... 294/19.1 |
| 4,192,539 | 3/1980 | Broyles et al. . |
| 4,248,465 | 2/1981 | Halstead ................................ 294/19.1 |
| 4,779,913 | 10/1988 | Henry ..................................... 294/50.9 |
| 4,783,926 | 11/1988 | McKinney et al. . |
| 4,881,338 | 11/1989 | Lung . |
| 5,228,226 | 7/1993 | Porosky . |
| 5,387,021 | 2/1995 | Brewer . |
| 5,458,385 | 10/1995 | Peeples . |
| 5,626,377 | 5/1997 | Carroll, Jr. et al. ................... 294/19.1 |

*Primary Examiner*—Dean Kramer
*Attorney, Agent, or Firm*—Michael A Mann; Nexsen Pruet Jacobs & Pollard LLP

[57] ABSTRACT

A device for picking up dead animals, in particular chickens and turkeys is advanced comprising a telescoping shaft with a pair of adjustable jaws extending perpendicularly therefrom. The jaws define a wedge therebetween which holds the animal securely therebetween when the device is rotated in an upward direction. The lower jaw is slightly longer than the upper jaw to allow an individual to slide the lower jaw under the animal. An O-ring marker and measuring legend are carried by the exterior of the shaft to enable one to assess visually whether the livestock watering pipes are at the appropriate height.

18 Claims, 2 Drawing Sheets

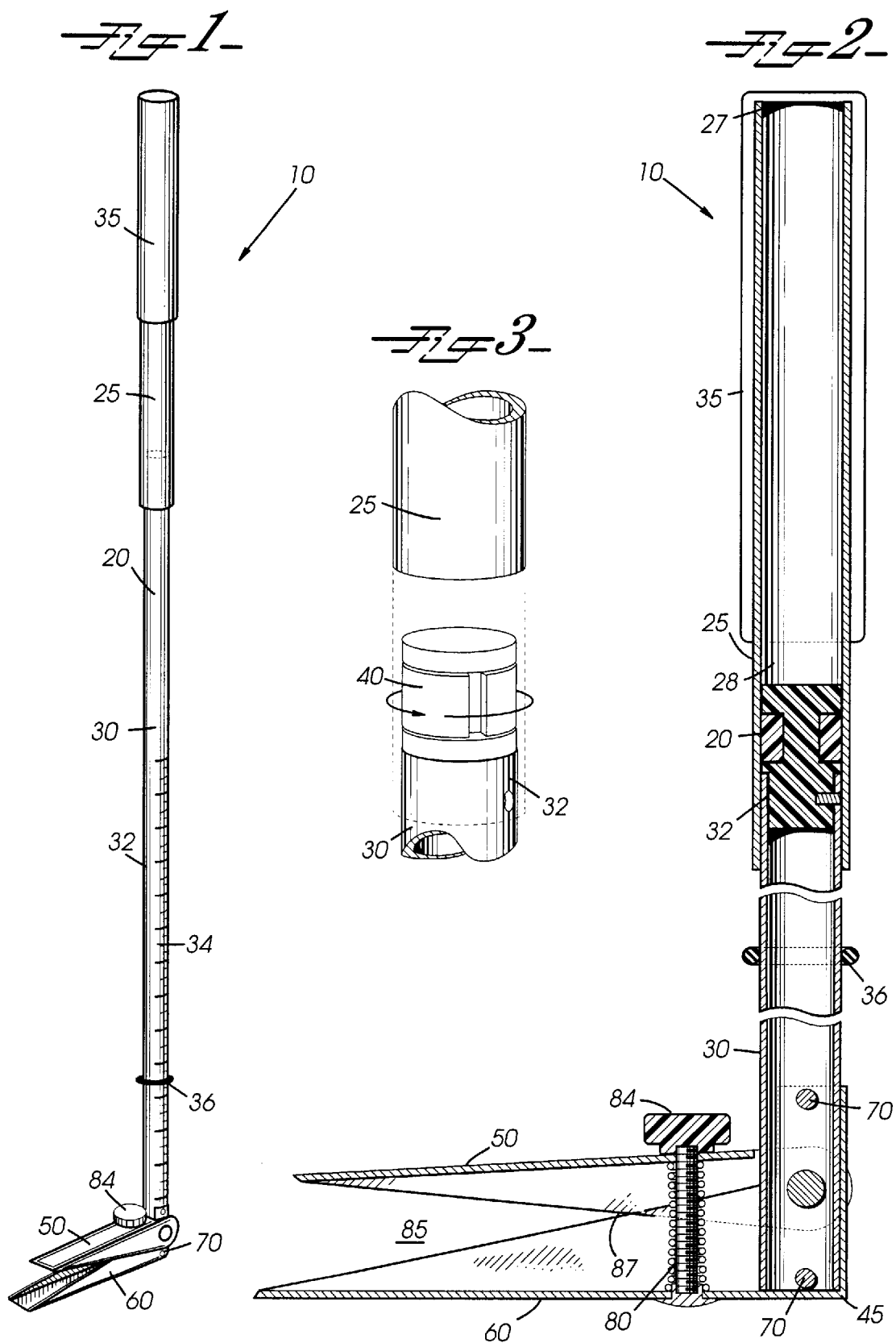

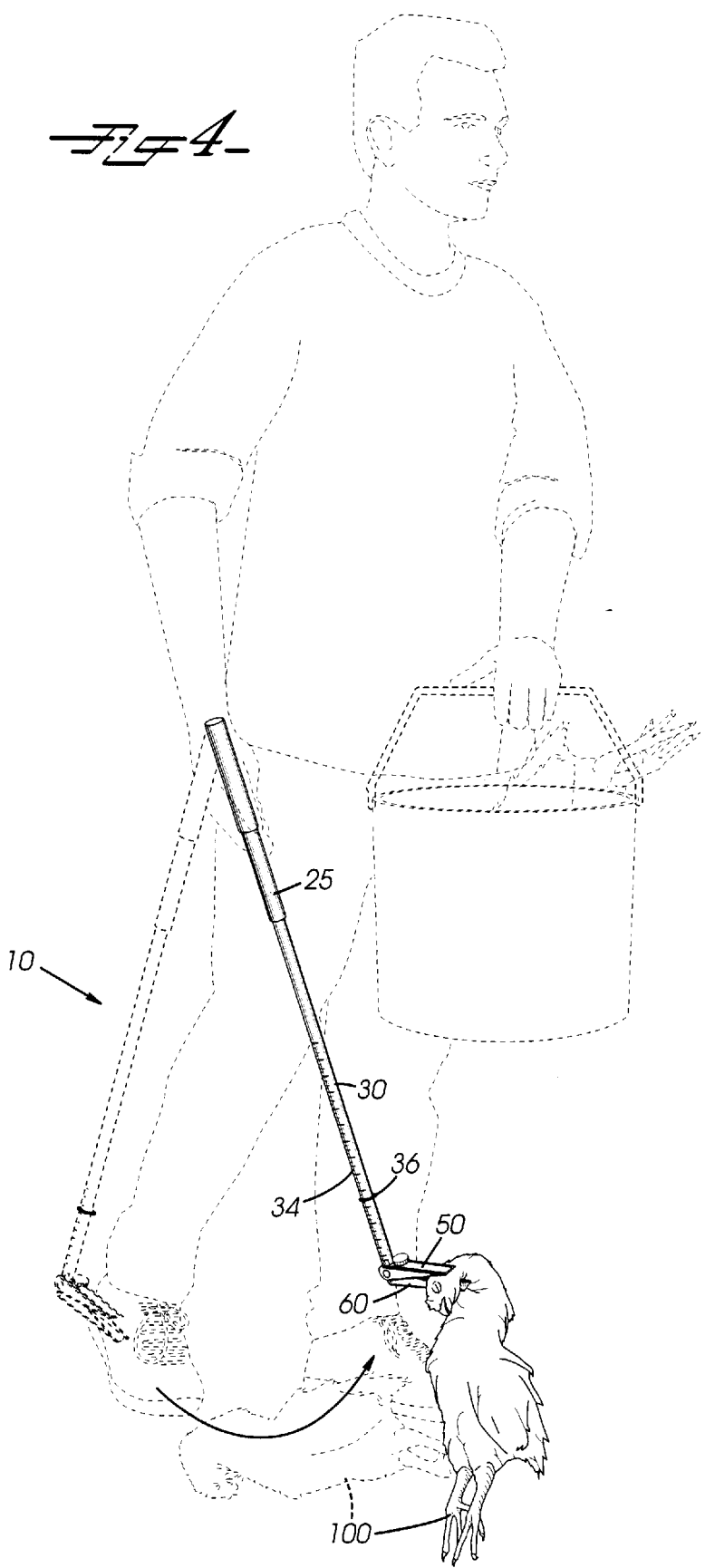

ANIMAL PICK-UP DEVICE

The inventors claim the benefit of the priority of their provisional patent application, Ser. No. 60/037,778, filed Feb. 13, 1997.

BACKGROUND OF THE INVENTION

1. Field of the Invention

The present invention relates generally to tools for picking up objects. In particular, the present invention advances a tool for lifting deceased animals.

2. Discussion of Background

There exists many situations wherein an individual must pick-up dead animals. Most notably, this task is faced on almost a daily basis by chicken and turkey farmers. The task involves searching through livestock and detecting dead birds. Once detected, the farmer usually bends over and picks up the deceased fowl by hand and subsequently disposes of it. For individuals with a large quantity of livestock, this removal procedure must be done repetitively, and if done manually, often leads to physical discomfort or injury. In addition, contact with these dead animals exposes the individual to disease. However, failure to promptly cull the dead birds increases the risk of exposing the livestock to infectious diseases.

Given the unavoidable but necessary task of removing deceased birds from livestock, the prior art has advanced several tools for use in picking up dead animals. For example, U.S. Pat. No. 5,458,385 teaches a grasping tool for picking up dead animals. The tool comprises a hollow shaft having an actuator mechanism. The actuator mechanism is operationally connected to a pair of pick-up plates fitted with sharp spikes and positioned at the end of the hollow shaft. In use, the operator pulls the actuator to close the plates, which in turn causes the spikes to penetrate the object of interest.

U.S. Pat. No. 3,785,689 teaches a grabbing tool having an angled shaft with a pair of tongs extending perpendicularly from the end of the shaft. A chain housed within the interior of the shaft effects closure of the tongs.

U.S. Pat. No. 3,885,824 advances a pickup device having a flat, pointed member which extends substantially perpendicular to a shaft. A pivotable member is disposed above the flat member and rotates downward toward the flat member to secure the object impaled on the flat member.

A problem shared by the devices advanced by the prior art is their reliance upon an actuator, usually a spring or chain, to effectuate closure of the jaws about the deceased animal. These actuation means increase manufacturing costs and complicate the process of culling dead animals from livestock. Moreover, these tools are normally left outdoors or in a barn where they are exposed to inclement weather. The actuation means are often made of material unsuitable for exposure to inclement weather and as a result, are prone to rust and consequent malfunction.

Therefore, there exists a need for an effective pick-up tool which is easy to manufacture, durable and simple to use.

SUMMARY OF THE INVENTION

According to its major aspects and briefly stated, the present invention is a device for picking up dead chickens, turkeys, Cornish game hens and like-sized fowl. The device comprises a telescoping shaft having a handle at one end and, at the opposing end of the shaft, a pair of jaws which define a wedge-shaped opening therebetween and which extend perpendicularly from the axis of the shaft. The jaws are held in spaced relation by a spring operably connected to an adjustment knob which permits the distance between the jaws to be varied. The lower jaw is slightly longer than the upper jaw. The shaft is marked with a measuring legend. Optionally, a movable O-ring carried by the shaft is moved to the desired location on the shaft's measuring legend to facilitate visual inspection of the height of water piping used to supply drinking water to the birds. The device may be made of any sturdy, waterproof material.

A major feature of the present invention is the pair of jaws which define a wedge therebetween. To pick up a dead animal, the user positions its neck or leg between the jaws. A slight rotational movement of the shaft causes the bird to be wedged between the jaws without the need for pulleys or levers. This feature simplifies the procedure of removing dead animals from livestock.

Another major feature of the present invention is the difference in length of the two jaws, the lower jaw being slightly longer than the upper jaw. Providing a longer lower jaw allows the device to be slid under the animal with greater ease to simplify the culling procedure.

Still another major feature of the present invention is the combination of the measuring legend and O-ring positioned along the length of the shaft. Most chicken and turkey houses are equipped with watering pipes positioned horizontally a distance above the ground. The watering pipes are fitted with a plurality of nipples through which the fowls obtain water. These pipes are supported by cables depending from the roof and from time to time, the distance between the ground and the pipes must be changed in order to accommodate the height of the growing birds. To assure that the watering pipes are at the proper height, an individual places the O-ring over the correct distance on the measuring legend and places the device vertically, next to the pipe. Thereafter, a visual inspection is made to determine whether the pipe is at the correct height.

Other features and their advantages will be apparent to those skilled in the art from a careful reading of the Detailed Description of Preferred Embodiments accompanied by the following drawings.

BRIEF DESCRIPTION OF THE DRAWINGS

In the drawings,

FIG. 1 is a perspective view of a pick-up device according to a preferred embodiment of the present invention;

FIG. 2 is a cross sectional view of a pick-up device according to a preferred embodiment of the present invention;

FIG. 3 is a detailed view of the cam mechanism for a pick-up device according to a preferred embodiment of the present invention; and FIG. 4 is a perspective view the operation of a pick-up tool according to a preferred embodiment of the present invention with an individual illustrated in ghost.

DETAILED DESCRIPTION OF PREFERRED EMBODIMENT

The present invention advances a device for use in picking up dead animals, in particular chickens and turkeys. Referring now to FIGS. 1 and 2, there is shown in perspective and in cross section, respectively, a pick-up device according to preferred embodiment and generally designated by reference numeral 10. Device 10 comprises a telescoping shaft 20 having an upper member 25 and a lower member 30. Attached to end 27 of upper member 25 is a handle 35. Handle 35 can be made of any polymeric material commonly used in the art. Shaft 20 is made of any durable, waterproof material. Positioned within end 32 of lower member 30 is an off center cam mechanism 40. Cam mechanism 40 permits telescoping of shaft 20 by sliding upper member 25 over lower member 30 until the proper height is achieved. Thereafter, upper member 25 is rotated about its axis until cam mechanism 40 abuts inner wall 28 of upper member 25, thereby holding the same securely in place. Rotation of cam mechanism 40 in the opposite direction loosens upper member 25 to enable its readjustment. It will be recognized by those with ordinary skill in the art that there are other commonly employed means by which shaft 20 can be made to telescope and that such means fall within the spirit and scope of the present invention.

Positioned along the outer surface 32 of lower member 30 is a measuring legend 34 and a slidable O-ring 36. Preferably, measuring legend 34 is denoted in inches and starts at end 45 with a reading of zero inches. The combination of O-ring 36 and measuring legend 34 enables an individual to assess the height of watering pipes that are common in chicken and turkey houses. The correct height of the watering pipes should vary in accordance with the size of the birds being housed. In operation, O-ring 36 is placed over the measurement on measuring legend 34 to mark the proper height on measuring legend 34 for the watering pipes. Device 10 is then placed adjacent to the watering pipe to determine if the pipe is at the correct height, which is indicated by comparison of the location of O-ring 36 to the height of the pipes.

Extending perpendicularly from end 45 of lower member 30 is an upper jaw 50 and a lower jaw 60. Jaws 50 and 60 are secured to lower member 30 by bolts 70 and can be made of any waterproof, durable material commonly employed in the art. It will be recognized that other securing means may be substituted for bolts 70 without departing from the spirit and scope of the present invention. A vertically positioned spring 80 is attached to both upper jaw 50 and lower jaw 60, permitting the distance between them to be adjusted as the particular application requires. Adjustment is effected by rotating an adjustment knob 84 operably connected to spring 80.

Lower jaw 60 is made slightly longer than upper jaw 50. Preferably, lower jaw 60 is approximately 0.5 inches greater in length than upper jaw 50. The greater length of lower jaw 60 enables a user to slide lower jaw 60 under the animal to be picked up.

Upper jaw 50 and lower jaw 60 define a wedge-shaped space 85 therebetween, which narrows to a point 87. As illustrated in FIG. 4, to operate device 10, an individual slides lower jaw 60 under the neck or leg of animal 100 until it is positioned between jaws 50 and 60. Thereafter, device 10 is rotated in an upward direction causing the neck or leg of animal 100 to slide toward point 87. This sliding action wedges animal 100 between jaws 50 and 60 and holds animal 100 securely therebetween. The animal is then disposed of in the proper manner.

What is claimed is:

1. A handheld tool for picking up a dead animal, said tool comprising:
   a shaft having a top end and a bottom end;
   a wedge shaped upper jaw carried by said bottom end of said shaft and approximately perpendicular to said shaft; and
   a wedge shaped lower jaw carried by said bottom end of said shaft and approximately perpendicular to said shaft, wherein said lower jaw is longer than said upper jaw.

2. The tool as recited in claim 1, wherein said upper jaw is positioned above said lower jaw to form a wedge therebetween.

3. The tool as recited in claim 1, said tool further comprising an o-ring slidably carried by said shaft.

4. The tool as recited in claim 1, wherein said lower jaw is approximately 0.5 inches longer than said upper jaw.

5. The tool as recited in claim 1, said tool further comprising a measuring legend carried by said shaft.

6. The tool as recited in claim 1, said tool further comprising means for biasing said upper jaw with respect to said lower jaw to control the distance between said upper jaw and said lower jaw.

7. The tool as recited in claim 1, said shaft further comprising:
   an upper member;
   a lower member; and
   means for telescoping said lower member with respect to said upper member.

8. A handheld tool for picking up a dead animal, said tool comprising:
   a shaft having a top end and a bottom end;
   a wedge shaped upper jaw carried by said bottom end of said shaft and approximately perpendicular to said shaft; and
   a wedge shaped lower jaw carried by said bottom end of said shaft and approximately perpendicular to said shaft, wherein said lower jaw is longer than said upper jaw, said upper jaw positioned above said lower jaw to form a wedge therebetween.

9. The tool as recited in claim 8, said tool further comprising an o-ring slidably carried by said shaft.

10. The tool as recited in claim 8, wherein said lower jaw is approximately 0.5 inches longer than said upper jaw.

11. The tool as recited in claim 8, said tool further comprising a measuring legend carried by said shaft.

12. The tool as recited in claim 8, said tool further comprising means for biasing said upper jaw with respect to said lower jaw to control the distance between said upper jaw and said lower jaw.

13. The tool as recited in claim 8, said shaft further comprising:
   an upper member;
   a lower member; and
   means for telescoping said lower member with respect to said upper member.

14. A handheld tool for picking up a dead animal, said tool comprising:
   a shaft having a top end and a bottom end;
   a wedge shaped upper jaw carried by said bottom end of said shaft and approximately perpendicular to said shaft;
   a wedge shaped lower jaw carried by said bottom end of said shaft and approximately perpendicular to said shaft, wherein said lower jaw is longer than said upper jaw, said upper jaw positioned above said lower jaw to form a wedge therebetween; and
   an o-ring slidably carried by said shaft.

15. The tool as recited in claim 14, wherein said lower jaw is approximately 0.5 inches longer than said upper jaw.

16. The tool as recited in claim 14, said tool further comprising a measuring legend carried by said shaft.

17. The tool as recited in claim 14, said tool further comprising means for biasing said upper jaw with respect to said lower jaw to control the distance between said upper jaw and said lower jaw.

18. The tool as recited in claim 14, said shaft further comprising:
   an upper member;
   a lower member; and
   means for telescoping said lower member with respect to said upper member.

* * * * *